United States Patent [19]

Mir

[11] 4,229,095
[45] Oct. 21, 1980

[54] ELECTRO-OPTICAL COLOR IMAGING APPARATUS

[75] Inventor: José M. Mir, Webster, N.Y.

[73] Assignee: Eastman Kodak Company, Rochester, N.Y.

[21] Appl. No.: 7,283

[22] Filed: Jan. 29, 1979

[51] Int. Cl.³ .............................................. G03G 15/01
[52] U.S. Cl. ............................................ 355/4; 355/35; 430/42
[58] Field of Search ................. 355/4, 3 P, 35–38; 96/1 PE, 1.2; 204/181 PE, 300 PE

[56] References Cited

U.S. PATENT DOCUMENTS

| | | | |
|---|---|---|---|
| 2,810,845 | 10/1957 | Howes | 310/172 |
| 2,975,311 | 3/1961 | Suhr | 310/172 |
| 3,158,769 | 11/1964 | Morrill | 310/172 |
| 3,293,729 | 12/1966 | Morrill | 310/172 |
| 3,319,965 | 4/1967 | Arnold | 310/172 |
| 3,327,146 | 6/1967 | Morrill | 310/216 |
| 3,634,707 | 1/1972 | Tillner | 310/172 |
| 3,697,842 | 10/1972 | Morrill | 310/172 |
| 3,959,678 | 5/1976 | Donahoo | 310/172 |
| 3,973,154 | 8/1976 | Broadway | 310/184 |
| 4,076,414 | 2/1978 | Tulbert | 355/38 |
| 4,125,322 | 11/1978 | Kaukeinen et al. | 355/4 |
| 4,131,814 | 12/1978 | Donahoo | 310/172 |

FOREIGN PATENT DOCUMENTS

1495926  8/1967  France ...................................... 310/172

Primary Examiner—R. L. Moses
Attorney, Agent, or Firm—John D. Husser

[57] ABSTRACT

Color imaging apparatus, for use with a multi-color mixture of photoconductive particles or other color sensitive imaging layers, comprises a plurality of separately-addressable, electro-optical illuminating means which concurrently subject a plurality of picture elements of such imaging layer respectively to different color light pulses in accordance with the color content of the image to be formed.

34 Claims, 8 Drawing Figures

ELECTRO-OPTICAL COLOR IMAGING APPARATUS

BACKGROUND OF THE INVENTION

1. Field of the Invention

The present invention relates to electro-optical color imaging apparatus and more specifically to such apparatus in which a plurality of discrete picture elements (pixels) of a color sensitive imaging layer(s) are concurrently imagewise exposed. The apparatus is highly useful for imaging with photoelectrophoretic dispersions but has application to many other color sensitive imaging layers, e.g., photographic emulsion layers.

2. Description of the Prior Art

Photoelectrophoretic migration imaging can be effected by the light image exposure of a dispersion layer, comprising photoconductive toner particles in a carrier medium, that is located between two electrodes providing a migration inducing field. U.S. Pat. No. 3,140,175 to Kaprelian discloses early procedures and apparatus of this type. In operation, the toner particles attain a charge and migrate from the dispersion to one of the electrodes. Upon exposure the illuminated particles migrate to the other electrode in accordance with the exposing light image pattern. Various embodiments for photoelectrophoretic migration imaging have been subsequently proposed (e.g., see U.S. Pat. No. 3,384,565). Recently a photoimmobilized electrophoretic migration imaging method has been described wherein the light-exposed, photoconductive toner particles are retained at the electrode to which they first migrate and unexposed particles change charge and migrate to the other electrode (see, e.g., U.S. Pat. No. 3,976,485).

Certain difficulties have arisen during efforts to commercialize such migration imaging systems; for example, high density images are difficult to attain. Also, for color imaging in general, it would be useful to have capabilities for color adjustment without inserting filter elements and image sense reversal without the forming of internegatives. Additionally, it is envisioned that office systems of the future may utilize electronic image transmission, and traditional optically-addressed copiers cannot accommodate such a future need.

In view of one or more of the problems and/or desired capabilities noted above, there have been described in the literature proposals for various electro-optical imaging systems. For example U.S. Pat. No. 3,663,396 and British Pat. No. 1,341,690 respectively disclose electronic address of a color cathode ray tube and an electro-luminescent panel used as the exposure source for a migration imaging system. Another electro-optical approach is disclosed in U.S. Pat. No. 4,058,828. In this device a multicolor laser beam is scanned point by point across the imaging area and modulated according to the point-by-point color content of the image to be reproduced. These approaches offer the potential for improved density, color adjustment and electronic transmission of images; however, the exposure elements and control systems for such systems are fairly complicated and expensive. The necessity to point scan an entire image also makes an imaging period somewhat lengthy.

My co-pending U.S. Application Ser. No. 821,114 entitled ELECTRONIC IMAGING USING MULTICOLOR ELECTROPHOTOSENSITIVE PARTICLES and filed Aug. 2, 1977 now U.S. Pat. No. 4,168,118 discloses an approach which has been found useful for obviating the above-described difficulties. In that approach, discrete pixels of migration imaging mixture are individually addressed by imagewise modulated electrical fields in timed relation to a series of differently colored light pulses. However in certain applications, difficulties have been encountered from the viewpoint of unwanted electrical interactions at the imaging zone and high voltage switching requirements.

SUMMARY OF THE INVENTION

The present invention pertains to improved electro-optical apparatus for producing color images. It has particular advantage in producing color images with the above-described migration imaging dispersions. It is an objective of the present invention to provide electro-optical color imaging apparatus which is relatively simple in design and which can produce quality images rapidly.

The above and other objects and advantages are achieved according to the present invention by provision of means for presenting successive strips of an imaging layer, sensitive to different light colors, at an exposure station, a plurality of discrete electro-optical means each individually addressable for providing light of said different colors on respective pixels of a strip at said exposure station and means for electrically addressing said electro-optical means so that the pixels of such strip are subjected, concurrently, to light of said different colors according to the image to be produced. In one preferred embodiment, the electro-optical means includes means for producing successive series of time-separated light pulses, each series including a pulse of each of said different light colors, a plurality of electrically-addressable, electro-optical modulator means actuatable for controlling the passage of light of such pulses to the pixels, and said addressing means synchronizes the actuation of each of said modulator means in a timed relation with such light pulses and according to the color characteristics of the image to be produced.

BRIEF DESCRIPTION OF THE DRAWINGS

The invention is hereinafter described with reference to the attached drawings which form a part hereof and in which.

DETAILED DESCRIPTION OF THE PREFERRED EMBODIMENTS

Figures 1, 2A:
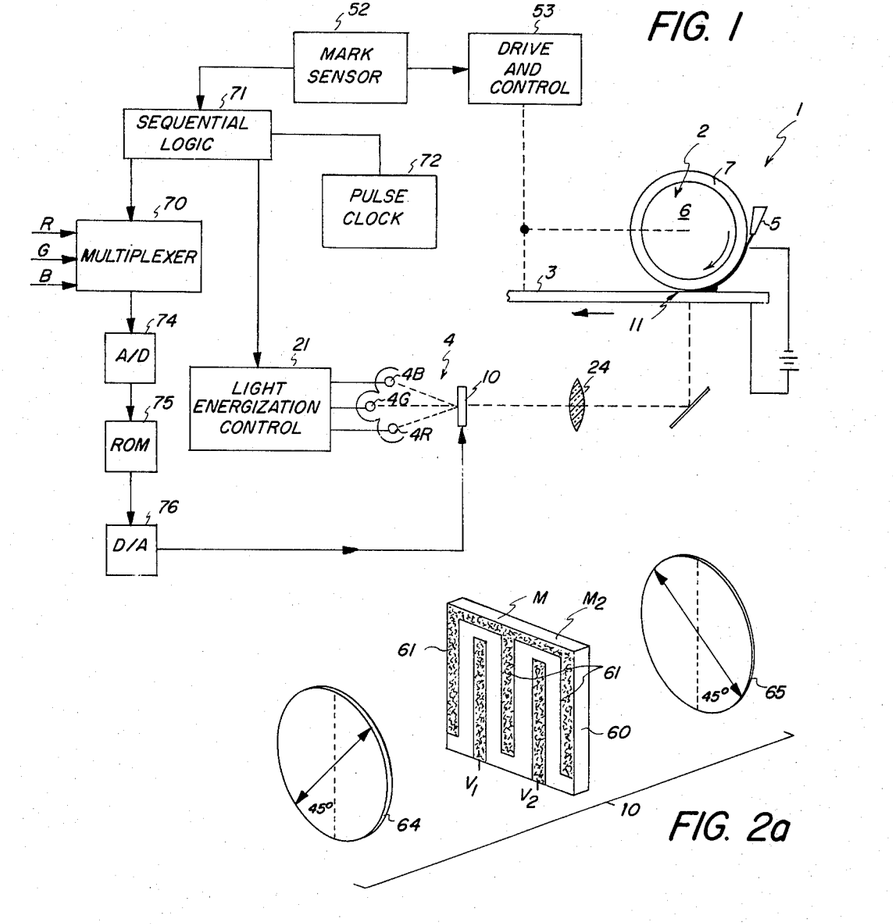
FIG. 1 is a schematic and block diagram illustrating one preferred embodiment of the present invention.
FIG. 2A is a schematic perspective view of an enlarged portion of an electro-optic device such as shown in FIG. 1.

Referring to FIG. 1, one preferred embodiment of imaging station 1 in accordance with the present invention comprises a cylindrical blocking electrode 2, a translating injecting electrode 3 and an electro-optical imaging device denoted generally 4. The blocking electrode 2 can be of a type known in the art and include for example, an electrically-conductive core 6 and an outer peripheral dielectric layer 7. The external surface of layer 7 can be the surface on which the utilized image is formed, and toner image formed thereon can be transferred to another sheet or fixed directly to layer 7 (in the latter instance the layer 7 could be removably secured to the core 6). Supply means 5, of a type known in the art such as an extrusion hopper, can be provided for supplying a uniform imaging layer of developer mixture, e.g., a conventional photoelectrophoretic suspension, on electrode 2. Blocking electrode 2 is mounted for rotation about a fixed axis at a position such that portions of its peripheral surface, i.e., the external surface of layer 7, successively pass exposure station 11.

Injecting electrode 3 is mounted for movement along a path so that successive transverse strip portions thereof pass the exposure station. The injecting electrode can be formed of transparent electrically-conductive material; however more often the electrode 3 is formed of a transparent support having a thin, transparent conductive layer on its upper surface. During imaging a source of relatively high voltage is applied between electrodes 2 and 3 to form a generally uniform, migration-inducing, electrical field across successive transverse strips of developer mixture at the exposure station.

It will be understood that the injecting and blocking electrode structure and configuration described above is conventional and that various different configurations for such electrodes are known in the art (e.g., two rotating cylinders). The present invention has utility with all or most such configurations, its general operative requirements being that the electrode configuration provide successive strips of developer in a migration field for imagewise exposure and a surface to which the particles can migrate.

Figure 2B:
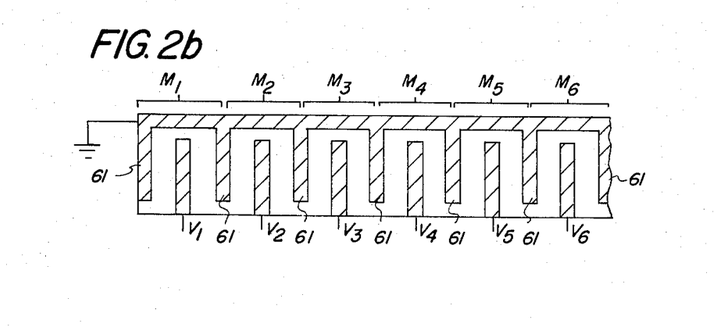
FIG. 2B is a plan view of a portion of the device as shown in FIG. 2A.

Referring now to FIGS. 2A and 2B, as well as FIG. 1, the electro-optical imaging device 4 will be described. In general, this embodiment of the invention contemplates the concurrent imagewise illumination of the discrete pixels of a strip of the suspension in the uniform electrical field between the electrodes. Such concurrent imagewise illumination involves subjecting the pixels in such strip to a predetermined exposure by different colored light pulses.

Figure 6:
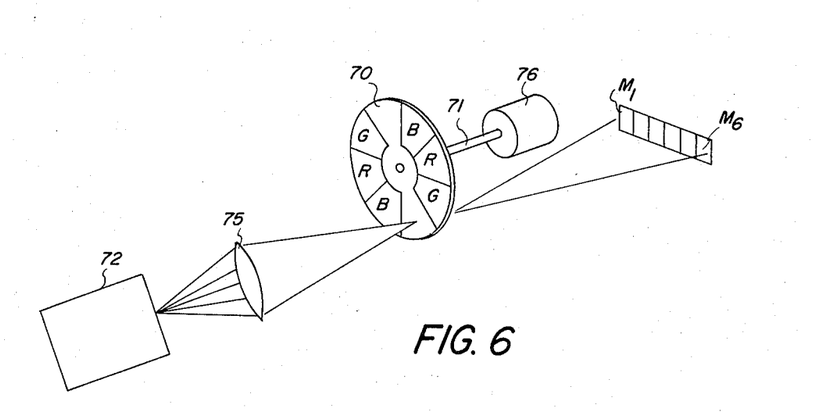
FIG. 6 is a perspective view of a modified portion of the apparatus shown in FIG. 1.

In the specific embodiment shown in FIGS. 1, 2A and 2B, this function is accomplished by sequential energization of sources $4_R$, $4_G$ and $4_B$, and by the synchronized electrical control of light modulating device 10. The sources $4_R$, $4_G$ and $4_B$ can be separate elongated flash lamps, having appropriate filters, and being energized, e.g., by a controllable power source 21, to provide successive series of time-separated pulses of a different wavelength radiation seriatim, e.g., red light, green light and blue light. It will be appreciated that other electromagnetic radiation in the visible or adjacent ranges can be utilized if the particles respond thereto and the term "light" is used herein to include all such radiation. Each source desirably can include means such as a reflector for directing illumination therefrom onto electro-optical device 10. An alternative means for providing such series of time-separated pulses, preferred in some applications, is shown in FIG. 6 and described hereinafter.

As shown in more detail in FIGS. 2A and 2B, the device 10 comprises a plurality of electro-optic modulators $M_1$–$M_6$ which are arranged in a linear array. As shown in FIG. 1, the lens 24 is positioned so that the electro-optic modulator array is imaged at the exposure station between the electrodes 2 and 3. The length of the array is selected and oriented so that its projected image at the exposure zone 11 extends transversely across the electrode nip. That is, the projected array should extend a distance generally equal to the transverse dimension of the image to be formed. The size of the individual modulator members $M_1$–$M_6$ depends on the image resolution desired because the size of the gates, in connection with the lens magnification (reduction) power, determines the size of a pixel of the image formed. For example, an imaging device might comprise 200 such modulators per inch across the width of an image to give high quality resolution.

The individual modulators can be formed of various electro-optic materials of the type which change light modulating properties, e.g., transmittance or polarization, in response to changes in an electrical field applied thereacross. A particularly preferred structure schematically illustrated in FIGS. 2A and 2B comprise a plate 60 of ferroelectric ceramic material, viz. lanthanum doped lead zirconate titanate (PLZT), which exhibits birefringence that varies as a function of the electric field thereacross. On one major surface of the plate 60 are a plurality of interleaved, opaque electrodes, formed, e.g., of evaporated conducting material. The series of electrodes 61 which extend from a top edge of the plate can be coupled to a common potential reference, e.g., ground. The electrodes extending from the lower edge are individually addressable to separate voltage levels and designated $V_1$ to $V_6$.

Light from sources $4_R$, $4_G$ and $4_B$ is transmitted to the plate 60 through polarizer 64 which is oriented, e.g., so that its direction of polarization is tilted 45° to the right of vertical and after passing plate 60 impinges on polarizer 65 which is oriented with its direction of polarization at right angles to that of polarizer 64, e.g., 45° to the left of vertical.

When there is no electric field applied on the plate 60 it is optically inactive (non-birefringent) and thus no light from polarizer 64 is transmitted through crossed polarizer 65. Upon application of an electric field to one or more of the modulating zones $M_1$–$M_6$, by application of appropriate voltage to electrodes $V_1$–$V_6$, the plate 60 becomes birefringent and rotates the direction of polarization of incident light by an extent dependent on the magnitude of the electric field. This results in transmission of light through polarizer 65, similarly as a function of the electric field.

The device 10 operates in the quadratic Kerr mode, where the electric field is perpendicular to the traversing light beam; however PLZT materials may also be operated in a scattering mode where the electric field is applied parallel to the traversing light beam.

Various electro-optic transducers using PLZT materials are known in the art, e.g., such as disclosed in U.S. Pat. Nos. 3,612,656; 3,998,523 and 4,053,207. Other electro-optic materials such as lithium niobate (LiNbO$_3$), gadolinium molybdate [Gd$_2$(MoO$_4$)$_3$], Pb$_5$Ge$_3$O$_{11}$, Bi$_4$Ti$_3$O$_{12}$ or various liquid crystal materials can also be utilized in certain applications of the present invention.

In the FIG. 2B device, a few of the discrete light gate structures $M_1$–$M_6$ comprising device 10 are shown supported on a single chip. Thus when the electrode(s) $V_1$–$V_6$ are energized, the modulator zones $M_1$–$M_6$ will change optical state and transmit light directed thereon from sources $4_R$, $4_G$ and $4_B$. It will be appreciated that the linear modulator array could comprise a plurality of linear arrays arranged end to end.

A brief description of the functions of the structure thus far described is believed useful before proceeding with the description of the portions of the apparatus which control such functions, bearing in mind that the exposing structure could be utilized equally well with other light-sensitive material such as photographic emulsion. To commence an imaging cycle a continuous layer of photoelectrophoretic suspension 22 is supplied at the imaging station 11 between blocking electrode 2 and injecting electrode 3 by means of the extruding hopper 5 forming such a layer on the blocking electrode 2 as it rotates clockwise therepast. The electrode 3 is moved past the exposure station from right to left as viewed in FIG. 1 so that successive portions of the electrodes' surfaces move past the exposure station with the layer of developer mixture therebetween. With the voltage applied between the electrodes the developer mixture therebetween is provided with a uniform electrical field which causes all the particles to move toward one electrode surface (here the injecting electrode 3). As previously indicated, the particles will remain at that electrode surface until activated by light of color to which they are sensitive.

Such activation is accomplished by electro-optical device 4. For purpose of explanation the layer passing the exposure station 11 can be thought of as comprising a plurality of transverse strips or lines of width equal to the imaged width of the electro-optical elements M. Each transverse band has a length equal to the imaged length of linear array of elements and can be considered as divided into a series of discrete segments, each defined by the projection of a portion of one element M on the transverse band. Each such segment forms a pixel which in accordance with the present invention is subjected to individual color separation imaging.

Figure 3:
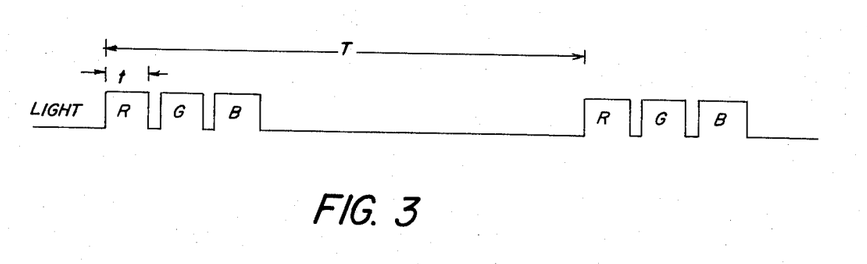
FIG. 3 is a diagram illustrating one mode of synchronizing modulator and light pulse energization.

More specifically, referring to FIG. 3 in conjunction with FIG. 1, the time period which each transverse strip passes over the exposure station is schematically denoted "T", the line period. Within each line period T the present invention contemplates at least three separate subperiods "t", during which each band or line can be exposed respectively to three successive pulses of light of different wavelength, e.g., red, green and blue light from sources $4_R$, $4_G$ and $4_B$. The coincident occurrence, during an exposure period t, of the electrical field and a light pulse will create deposition of suspension particles activated by that light wavelength on the aligned pixel of the blocking electrode 2. The coincidence of such field and no light pulse reaching the developer mixture results in no particle deposition.

Thus, if none of the electro-optic elements were activated (to pass light) during an entire imaging cycle, i.e., rotation of electrode 2 through one revolution and with synchronous movement of electrode 3 from a rightmost position to a left-most position, no particles would be deposited on any pixel of electrode 2, even though the sources $4_R$, $4_G$, $4_B$ provided their sequential exposure pulses during each of line periods T of the cycle. However, if all electro-optic elements were actuated during (and only during) the red pulse subperiod t of each line period T in a copy cycle, only the photoconductive particles activated by the red light (e.g., cyan particles) would migrate to each pixel on the image electrode 2. Similarly if the elements were actuated during the red and green subperiods, cyan and magenta particles would migrate to each pixel. If the elements were actuated during all three subperiods the yellow particles would also migrate in response to the coincidence of field and blue light exposure.

Considering the foregoing, it will be appreciated that by proper control of the time of actuation of each electro-optic element, in relation with the three sequential exposing light pulses t which occur during each line period T, the tricolor photoelectrophoretic suspension can be caused to migrate to form a color separation image.

Figure 4:
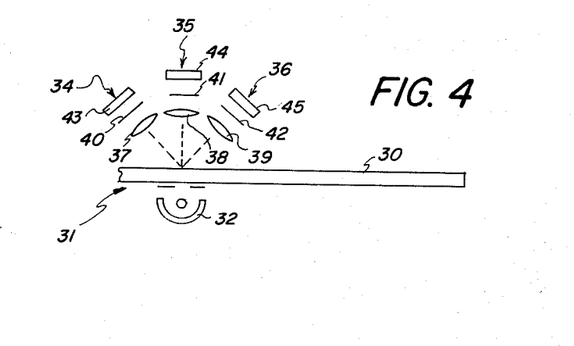
FIG. 4 is a schematic side view of one original scanning station in accordance with the present invention.
Figure 5:
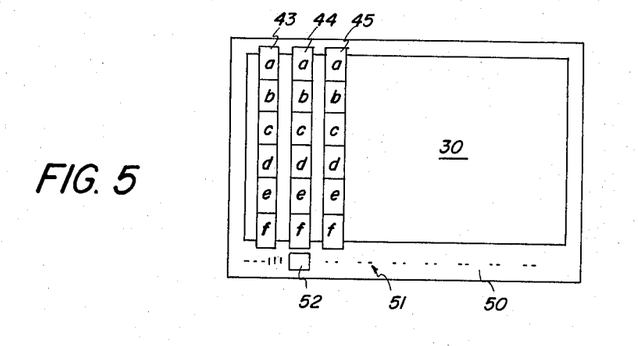
FIG. 5 is a schematic top view of the apparatus shown in FIG. 4.

Referring now to FIGS. 4 and 5, an embodiment is illustrated for providing image information to address the elements of electro-optical device 10, in response to scanning of a color original. As shown in FIGS. 4 and 5, the original 30, e.g., a photographic color negative transparency is moved past a scanning station 31. The scanning station can comprise a panchromatic light source 32 and separate photosensor systems 34, 35 and 36 located on the opposite side of the original. To provide color separation information, each photosensor system respectively includes, a lens 37, 38 and 39, a color filter 40, 41 and 42 and a photocell array 43, 44 and 45. The filter-photocell combination of each system is selected to provide information as to a different color separation component of the portion of original passing thereunder. For example, light from lamp 32 color modulated by the original 30, is focused by lens 37 onto photocell 43 passing through filter 40. Assuming system 34 to be a red color information sensor, the filter 40 is a red filter and the photocell 4 is red-light sensitive. Sensor systems 35 and 36 can similarly be formed as green and blue information sensors respectively. As shown in FIG. 5, each of the photocell arrays 43, 44 and 45 respectively comprises a plurality of discrete photosensors $43a$–$f$, $44a$–$f$ and $45a$–$f$ (corresponding in number to the number of modulator elements $M_1$–$M_6$ of device 10) which detect color information from a pixel element of the original, one line at a time.

As shown in FIG. 5, the original 30 is supported for movement past the photosensor systems on a transparent platen 50 having timing marks 51 thereon. A detector 52 is supported in alignment with the path of movement of the timing marks, and can include, e.g., a light source on one side of platen 50 which directs light through the timing marks to a photocell on the other side. Similar detection marks can be placed on electrodes 2 and 3 and the signals fed to a drive and control system 53, e.g., such as disclosed in U.S. Pat. No. 4,044,248, for maintaining movement of the original and the electrodes in synchronization. It is essential that the blocking electrode 2 be moved in optical synchronism with the movement of the original and various other synchronization techniques known in the art can be utilized to accomplish this result. In a preferred embodiment the electrode 3 also is moved to provide zero relative velocity with respect to contiguous portions of electrode 2, however, this is not essential. It is of course necessary that the periods of energization and non-energization of elements $M_1$–$M_6$ be properly related to the movement of the original and blocking electrode 3 and with respect to the three exposure pulses which occur during the line periods T of those elements.

For this purpose, a control circuit such as disclosed in FIG. 1 can be provided. As indicated in that figure the red, green and blue light intensity signals generated by a set of photosensors, e.g., 43a, 44a and 45a (FIG. 4) associated with a corresponding modulator element, e.g., $M_1$, are directed to the input terminals of a conventional multiplexer logic package 70. The multiplexer 70 is controlled by a sequential logic device 71 such as a shift register, counter or flip flop, which provides sequentially three digital selection signals that control the successive output of the red, green and blue light intensity signals from multiplexer 70. A pulse clock 72 provides a series of synchronizing timing pulses to device 71 which resets to an inactivating condition after each series of red, green and blue outputs and remains inactive until the mark detector 52 signals the commencement of another output of color information for the next successive line of the original. As shown, the device 71 also provides sequential digital signals to the light energization control 21 to control sequential actuation of the red, green and blue sources in synchronism with the red, green and blue color information output from the multiplexer 70.

Upon output from the multiplexer 70, the analog signal representative of the intensity, e.g., red light intensity of a pixel, is converted by an analog-to-digital converter 74 to a digital signal representative of the range of intensity within which the signal resides. This red intensity digital signal addresses a read only memory 75 which, in response provides to digital-to-analog converter 76 a digital signal indicative of the appropriate voltage to be impressed on the corresponding light valve during the red light period t. That is, the extent of cyan particle deposition on imaged electrode 2 is a function of intensity of exposure. Therefore a tone scale for each color component can be provided by varying the voltage impressed across an element M, which in turn controls the extent of light transmission through the element and thus the intensity of illumination of the pixel at the exposure station.

Upon receipt of the next clock pulse, the green light intensity signal would be output from multiplexer 70 through the conversion circuitry, in synchronism with actuation of the green illumination source. Similarly in response to the third clock pulse, the blue light signal would be output; and the next subsequent clock pulse will reset device 71 to its initial condition, awaiting initiation of another activating sequence by mark detector 52, when the original has advanced another line.

It will be appreciated that signal processing and timing circuitry described above will exist for each aligned R, G and B photosensor set and its corresponding electro-optical modulator element (i.e., 43a, 44a, 45a and $M_1$ ... 43f, 44f, 45f and $M_6$). Also it will be understood that the color information of a particular type, e.g., red, green or blue, is transmitted concurrently to each pixel in a given line. That is, first the output of photosensors 43a-f will transmit the red information to the elements $M_1-M_6$ in synchronism with the red light pulse, then the sensors 44a-f will transmit green information to the elements $M_1-M_6$ during the green light line exposure then sensors 45a-f will transmit the blue information to elements $M_1-M_6$ during blue exposure. When this tri-color exposure sequence has been completed for each line of the original, a copy sequence is complete.

As an example of typical parameters, at an electrode speed of 2 inches per second and with an electrode spacing of 10 electrodes per m.m., light exposures of about 100 ergs/cm$^2$ and voltages in the range of 0–200 volts can be utilized.

It will be apparent that, if imaging is to be implemented in a single array, single pass mode, the cumulative time for each series of three exposure periods t must not exceed the line period T, which will be equal to the exposure station width "W" divided by the velocity "V" of the imaged electrode surface. It is preferable, to obtain good color overlap, that $t<<W/V$. This can be accomplished by proper selection of the clock pulse rate in conjunction with the rate of movement of the electrode 2.

Although the invention has been described with respect to a particular embodiment it will be appreciated that significant modifications and a wide variety of alternative structures can be utilized for practice of the present invention.

For example with proper signal delay and signal amplifying circuitry the analog signals from the photocells could be input to the electrodes $V_1-V_6$. Also in certain embodiments of the invention, tone scale might not be required and the read only memory and related converting circuitry could be eliminated. Further, if desired certain color correction functions could be effected by detecting qualities of the sensed original intensity signals electronically comparing those signals and providing compensation processing for the signals output to the electro-optical elements.

Other devices and modes can be used for achieving a color tone variation, or gray scale, if desired. For example, for off-on type electro-optical elements the electro-optical elements can be energized, during each pixel exposure period for each color of light, according to a variable length. That is, if a low density red component is desired for a pixel, the element be "on" (i.e., transmitting light of fixed intensity) only for 10% of the time during that particular red light exposure period for the pixel. Similarly, if high red density was desired the time might be, e.g., 90%. Similarly, a stepped voltage signal can be provided for address to the elements during each pixel color exposure period and the elements selectively addressed by that signal during the stage of its period at which it is at the desired voltage level step.

The illumination source could also take alternative forms. For example, as shown in FIG. 6, chopped pulses could be provided by rotating a filter-disk 70, having red, green and blue light filter sections, on a shaft 71 to sequentially intersect a convergent zone in the path of the beam of a panchromatic light from source 72 directed to modulators $M_1-M_6$ by, e.g., cylindrical condenser lens 75. The rotation of the filter-disk 70 can be controlled or sensed by a shaft encoder 76 and thus synchronized with respect to the address of the electrodes and movement of the imaged material.

It is emphasized that although the invention has been described herein with respect to migration imaging, for which it is particularly useful; it will be readily appreciated that it has broad application to many other color-sensitive imaging material, e.g., photographic films or papers.

Figure 7:
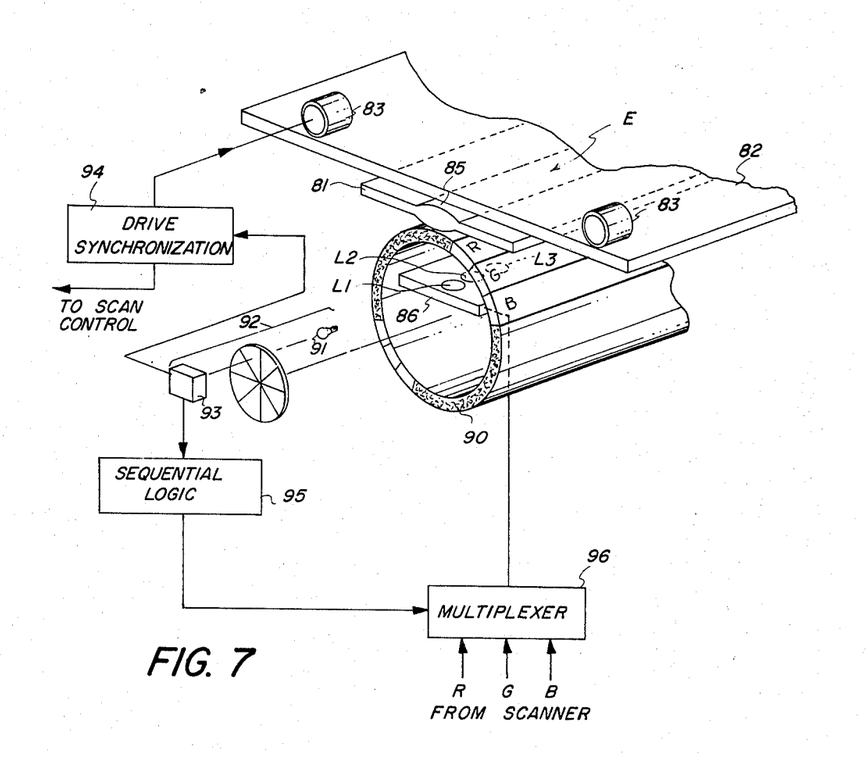
FIG. 7 is a perspective schematic view of another embodiment of the present invention.

Referring to FIG. 7, an alternative embodiment of the present invention is illustrated in a form applicable for imaging on a sheet of photographic color paper. As shown, such an imaging sheet can be moved across an exposure zone E, defined by mask members 81, by a transport platen 82 which can support the sheet, e.g., by vacuum attachment with its imaging layer facing downward. The platen can be driven by known means, illustrated schematically by rollers 83. An elongated lens element 85 can be provided in the exposure slit for purposes to be described below.

Located in spaced relation from the exposure zone, e.g., at the object plane of lens 85 is an elongated array 86 which includes a plurality of discrete, separately addressably light sources $L_1, L_2, L_3 \ldots$. These discrete light emitters should provide a fairly flat spectrum over the range of color sensitivity of the imaged medium. Elements such as plasma discharge devices (PDP's) or electroluminescent panels may be useful for this purpose. As shown the array is aligned with the exposure strip defined by the mask members 81 so that upon energization, each source L will direct panchromatic light toward respective pixel portions of the successive strips of an imaging sheet as it is moved past the exposure slit.

A cylindrical filter member 90 is mounted for rotation on shaft 91, which is parallel to the exposure zone, so that successive peripheral portions thereof move between the illuminating array 86 and the strips of the image sheet moved through the exposure zone. As shown, the sections of the filter member comprise different wavelength filters, e.g., red, green and blue light passing. The remaining periphery of the cylinder can be opaque.

During an imaging operation the rotation of the cylinder, by drive means not shown, is detected by shaft encoder 92, e.g., an encoded wheel, light source and pulse generating detector 93, and the drive of platen 82 is synchronized by control 94 relative to the rotation of the filter member 90. The appropriate relative movement for these elements is such that the period T during which each strip the image sheet is at the exposure zone is substantially greater than the sequential exposure periods of such strip t, in which the separate filter sectors R, G, B are between sources L of the strip, i.e., $T >> t$.

As shown by block diagram, the pulse generator 93 also signals sequential logic device 95, which in the same manner described with respect to FIG. 1, initiates output from multiplexer 96 of the red, green and blue information, e.g., received from a scanner such as shown in FIGS. 4 and 5. Control 94 also can provide synchronization for the platen of the scanner.

Thus as successive strips of the color sensitive layer of the photographic print sheet are moved past exposure zone E, the filter member is rotated to present at least three separate periods t during which light from sources L will be red, green or blue. By using the video information from the scanner to selectively energize the respective sources $L_1, L_2, L_3$, etc., in response to pixel information sensed from a strip of the original to be reproduced, the pixels of each imaging strip passing the exposure zone will be exposed (or not) appropriately to red, green and blue light pulses according to the original.

It will be apparent to one skilled in the art that various subsystems disclosed in the FIG. 1, FIG. 6 and FIG. 7 embodiments can be interchanged and further that various other equivalent structures can be utilized in lieu of structure specifically disclosed herein.

The invention has been described in detail with particular reference to certain preferred embodiments thereof, but it will be understood that variations and modifications can be effected within the spirit and scope of the invention.

What is claimed is:

1. Apparatus for color imaging at an exposure station with a photosensitive layer adapted to record different colors of light, said apparatus comprising:
   (a) means for presenting successive strips of such layer at said exposure station;
   (b) exposing means including a plurality of discrete electro-optical means, each individually addressable by electrical energization for providing light of said different colors on a respective pixel of a strip at said exposure station; and
   (c) means for electrically addressing said plurality of electro-optical means concurrently so that the pixels of such strip are concurrently subjected to light of said different colors according to an image to be produced;
   said exposing means including means for producing successive series of time-separated light pulses, each series including a pulse of each of said different light colors and said electro-optical means each including an electro-optical modulator, located between said pulse producing means and said exposure station, each such modulator being electrically addressable for controlling the passage of such light pulses to a respective pixel.

2. The invention defined in claim 1 wherein each such electro-optical modulator includes an electrically-addressable PLZT ceramic material and cooperating light polarizing means.

3. The invention defined in claim 1 wherein said addressing means includes means for varying the electrical energization of said electro-optical means to effect density variations in the image to be reproduced.

4. The invention defined in claim 1 wherein said addressing means includes means for synchronizing the actuation of each of said modulators in a timed relation with such light pulses and according to the color characteristics of the image to be produced.

5. Apparatus for color imaging at an imaging station with a recording layer which is selectively sensitive to light of different colors, said apparatus comprising:
   (a) means for moving successive strips of such recording layer past said imaging station;
   (b) means for producing successive series of time-separated light pulses, each series including a pulse of each of said different light colors;
   (c) electro-optical means including a plurality of discrete electro-optic modulator means, each electrically-addressable for controlling the passage of light from such pulses to a respective pixel of a strip at said imaging station; and
   (d) means for electrically addressing said modulator means in a timed relation to such light pulses and according to the color characteristics of the image to be produced so that the pixels of each successive strip are concurrently subjected to light of said different colors, sequentially and according to an image to be produced.

6. Electro-optical color imaging apparatus for use with an imaging layer of the type which can record different light colors, said apparatus comprising:
   (a) means for disposing such an imaging layer in an imaging station of said apparatus;
   (b) a plurality of discrete electro-optical exposing means, spaced from said imaging station, each for selectively providing sequential pulses of light toward a respective one of a plurality of pixel zones extending across said station;

(c) moving means for providing relative movement between said exposing means and such imaging layer such that successive portions of said layer are sequentially aligned with said exposing means; and (d) means for controlling said exposing means so the pixels of such successive layer portions are concurrently subjected to light pulses of said different colors in accordance with a color image pattern to be reproduced;

said electro-optical exposing means including light pulse generating means for providing successive series of separated light pulses, each series including at least one pulse of each of said different light colors, and a plurality of discrete electrically-addressable light valve means for selectively modulating passage of such light pulses to respective pixel zones.

7. The invention defined in claim 6 wherein each of said light valve means includes an electrically-addressable PLZT ceramic material and cooperating light polarizing means.

8. The invention defined in claim 6 wherein said controlling means includes means for varying the electrical energization of said light valve means to effect density variations in the image to be reproduced.

9. Apparatus for color imaging with a layer of developer which contains electrophotosensitive particles of different color types, respectively sensitive to light of different colors, said apparatus comprising:

(a) electrode means for forming generally-uniform, electrical fields across successive strips of such developer layer;

(b) exposing means including a plurality of discrete electro-optical means, each individually addressable for providing light of said different colors on a respective pixel of a strip within the field of said electrode means; and (c) means for electrically addressing said electro-optical means so that the pixels of such strip are concurrently subjected to light of said different colors according to an image to be produced;

said exposing means including means for producing successive series of time-separated light pulses, each series including a pulse of each of said different light colors and said electro-optical means each including an electrically-addressable, electro-optic modulator means actuatable for controlling the passage of light from such pulses to a respective pixel.

10. The invention defined in claim 9 wherein said electro-optic modulator means includes an electrically-addressable PLZT ceramic material and cooperating light polarizing means.

11. The invention defined in claim 9 wherein said addressing means includes means for varying the energization of said modulator means to effect density variations in the image to be reproduced.

12. The invention defined in claim 9 wherein said addressing means includes means for synchronizing the actuation of each of said modulator means in a timed relation with such light pulses and according to the color characteristics of the image to be produced.

13. Apparatus for color imaging with a layer of developer which contains electrophotosensitive particles of different color types, respectively sensitive to light of different colors, said apparatus comprising:

(a) electrode means for forming generally-uniform, electrical fields across successive strips of such developer layer;

(b) means for producing successive series of time-separated light pulses, each series including a pulse of each of said different light colors;

(c) electro-optical means including a plurality of discrete electro-optic modulator means, each electrically-addressable for controlling the passage of light from such pulses to a respective pixel; and (d) means for electrically addressing said modulator means in a timed relation to such light pulses and according to the color characteristics of the image to be produced so that the pixels of such strip are concurrently subjected to light of said different colors, sequentially and according to an image to be produced.

14. Apparatus for color imaging, at an exposure station, a photosensitive layer of the kind adapted to record different colors, said apparatus comprising:

(a) exposure means for exposing successive strip portions of such layer at said exposure station, each strip portion comprising a row of pixel regions, said exposure means including a linear array of discretely operable electro-optical means that are each respectively located for alignment with a different pixel region of such strip portions and that are each individually addressable by electrical energization for effecting multicolor exposure of its respective pixel region; and (b) means for electrically addressing each of said electro-optical means concurrently and according to the color content of respective portions of an image to be produced.

15. The invention defined in claim 14 wherein each of said electro-optical means includes at least one individually-addressable light gate.

16. The invention defined in claim 15 wherein such light gate includes a PLZT ceramic material and cooperating polarizing means.

17. The invention defined in claim 14 wherein said addressing means includes means for varying the electrical energization of said exposure means to effect density variations in the image to be reproduced.

18. Apparatus for color imaging with a photosensitive layer adapted to record different colors of light, said apparatus comprising:

(a) means for supporting such layer at an exposure station of said apparatus;

(b) exposing means, including an array of discrete electro-optical means that are each respectively aligned with a different pixel region of said exposure station and are each individually addressable, for effecting multicolor exposure of its respective pixel region; and (c) means for electrically addressing each of said electro-optical means in parallel according to the color content of its respective portion of an image to be produced.

19. The invention defined in claim 18 wherein said addressing means includes means for varying the quantity of light from said exposing means.

20. The invention defined in claim 18 wherein each of said electro-optical means includes at least one light valve means, including a PLZT ceramic material and cooperating polarizer means.

21. Electro-optical color imaging apparatus for use with an imaging member of the type which can record different light colors, said apparatus comprising:
  (a) means for disposing such an imaging member in an imaging station of said apparatus;
  (b) an array of discrete electro-optical exposing means, spaced from said imaging station, each exposing means of said array being adapted to produce a plurality of different pulses, of different light color, directed toward its respective one of a plurality of pixel regions of said imaging station; and
  (c) means for controlling said exposing means so the pixel regions of such imaging member are concurrently subjected to such light pulses in accordance with a color image pattern to be reproduced.

22. The invention defined in claim 21 wherein each of said exposing means includes at least one light valve means.

23. The invention defined in claim 22 wherein such light valve means includes a PLZT ceramic material and cooperating polarizer means.

24. The invention defined in claim 21 wherein said controlling means includes means for varying the quantity of light from said exposing means.

25. Electro-optical imaging apparatus for use with an imaging member of the type which can record different light colors, said apparatus comprising:
  (a) means for disposing such an imaging member in an imaging station of said apparatus;
  (b) an array of discrete electro-optical exposing means spaced from said imaging station, each exposing means of such array being adapted to produce a plurality of different light pulses, respectively of a different light color, at its respective one of a plurality of different pixel regions extending across said imaging station;
  (c) moving means for providing relative movement between said array of exposing means and such imaging member so that successive portions of such member are sequentially aligned with said array; and
  (d) means for controlling said exposing means of said array so that a plurality of pixel regions of such member are subjected in parallel to light pulses of said different colors in accordance with a predetermined color image pattern to be reproduced.

26. The invention defined in claim 25 wherein each of said exposing means includes at least one light gate, including a PLZT ceramic material and cooperating light polarizing means.

27. A method of electro-optical color imaging comprising the steps of:
  moving an image element having a multicolor-sensitive recording layer along an imaging path;
  directing toward lines of such image element flood illumination pulses, successively, of different light colors; and
  modulating the passage of light, from each of such pulses, to the lines of the image element with a plurality of discretely operable, pixel light valves that are concurrently addressed with pixel information according to the color content of a corresponding line of the image to be reproduced.

28. The invention defined in claim 27 wherein said modulating includes varying the quantity of light passage to effect density variations in the image to be reproduced.

29. The method defined in claim 27 wherein such modulating includes varying the time a predetermined intensity of light is allowed to pass to effect density variations in the image to be reproduced.

30. The invention defined in claim 27 wherein said modulating includes varying the intensity of light passage over a fixed period of time to effect density variations in the image to be reproduced.

31. Apparatus for electro-optical color imaging, comprising:
  means for moving an image element having a multicolor-sensitive recording layer along an imaging path;
  means for directing toward lines of an image element moving along said path flood illumination pulses, successively, of different light colors; and
  means for modulating the passage of light of each of such pulses to the lines of the image element, said modulating means including a plurality of discretely operable, pixel light valves and means for concurrently addressing said light valves with pixel information in accordance with the color content of the corresponding line of the image to be reproduced.

32. The invention defined in claim 31 wherein said modulating means includes means for varying the quantity of light passage to effect density variations in the image to be reproduced.

33. The invention defined in claim 31 wherein such modulating means includes means for varying the time a predetermined intensity of light is allowed to pass to effect density variations in the image to be reproduced.

34. The invention defined in claim 31 wherein said modulating means includes means for varying the intensity of light passage over a fixed period of time to effect density variations in the image to be reproduced.

* * * * *